United States Patent [19]
Soltani-Ahmadi

[11] Patent Number: 5,891,818
[45] Date of Patent: Apr. 6, 1999

[54] CYANIDE COMPLEX CATALYST MANUFACTURING PROCESS

[75] Inventor: Ahmad Soltani-Ahmadi, Radnor, Pa.

[73] Assignee: Arco Chemical Technology, L.P., Greenville, Del.

[21] Appl. No.: 903,011

[22] Filed: Jul. 31, 1997

[51] Int. Cl.⁶ ............................... B01J 27/26; B01J 27/24
[52] U.S. Cl. .......................................... 502/175; 502/200
[58] Field of Search ...................................... 502/175, 200

[56] References Cited

U.S. PATENT DOCUMENTS

| | | |
|---|---|---|
| 3,278,459 | 10/1966 | Herold . |
| 3,393,243 | 7/1968 | Cuscurida . |
| 3,404,109 | 10/1968 | Milgrom . |
| 3,427,256 | 2/1969 | Milgrom . |
| 3,427,334 | 2/1969 | Belner . |
| 3,427,335 | 2/1969 | Herold . |
| 3,538,043 | 11/1970 | Herold . |
| 3,900,518 | 8/1975 | Milgrom . |
| 3,941,849 | 3/1976 | Herold . |
| 4,282,387 | 8/1981 | Olstowski . |
| 4,355,188 | 10/1982 | Herold . |
| 4,472,560 | 9/1984 | Kuyper . |
| 4,477,589 | 10/1984 | van der Hulst . |
| 4,877,906 | 10/1989 | Harper . |
| 5,010,187 | 4/1991 | Heuvelsland . |
| 5,114,619 | 5/1992 | Heuvelsland . |
| 5,124,425 | 6/1992 | Higuchi . |
| 5,158,922 | 10/1992 | Hinney . |
| 5,248,833 | 9/1993 | Hinney . |
| 5,470,813 | 11/1995 | Le-Khac . |
| 5,482,908 | 1/1996 | Le-Khac . |
| 5,494,957 | 2/1996 | Moore . |
| 5,545,601 | 8/1996 | Le-Khac . |
| 5,639,705 | 6/1997 | Bowman et al. ....................... 502/175 |

*Primary Examiner*—Elizabeth Wood
*Attorney, Agent, or Firm*—Jonathan L. Schuchardt; William G. Conger

[57] ABSTRACT

In the preparation of double metal cyanide complex catalysts, higher catalyst yield and higher catalyst activity may be obtained by recirculating a stream of catalyst dispersion to the reactor head space in the form of a spray, and by directing this or another circulation loop stream through a high shear in-line mixer. The process economics and catalyst purity may be increased by increasing the solids content of the wet centrifuge/filtration cake to higher solids by pressing the wet cake, preferably by diaphragm squeezing. The number of washes may be decreased thereby without affecting catalyst quality.

14 Claims, No Drawings

CYANIDE COMPLEX CATALYST MANUFACTURING PROCESS

TECHNOLOGICAL FIELD

The present invention pertains to double metal cyanide complex catalysts. More particularly, the subject invention pertains to improved processes for manufacture of double metal cyanide catalysts. The claimed processes produce not only higher yields of catalyst, but also produce catalysts of improved quality as demonstrated by their catalytic activity.

DESCRIPTION OF THE RELATED ART

Double metal cyanide complex catalysts were first discovered in the decade of the sixties, as evidenced by U.S. Pat. Nos. 3,427,256; 3,427,334; 3,278,459, and like patents. The catalysts were shown to be useful in a variety of polymerization reactions. However a use which appeared particularly promising was the polyoxyalkylation of hydric initiators to form polyoxyalkylene polyols.

For example, in the conventional manufacture of polyoxyalkylene polyols, one or more alkylene oxides are polymerized onto a hydric initiator molecule such as ethylene glycol, propylene glycol, glycerin, sorbitol, or the like. The catalysts generally employed are alkali metal hydroxides such as sodium hydroxide or potassium hydroxide, at temperatures in the range of 110° C. and at a reasonable alkylene oxide pressure. Early in the development of polyoxyalkylene polyols, it was discovered that the actual functionality of polyoxyalkylene polyols obtained through base catalysis was not the same as the functionality of the initiator molecule. Further investigation led to the recognition that considerable amounts of unsaturated monofunctional species were present in the product. These monofunctional species are believed to be produced by the rearrangement of propylene oxide into allyl alcohol which itself serves as an oxyalkylatable monofunctional initiator.

Thus, for example, during the oxypropylation of glycerin, allyl alcohol is continuously generated as oxypropylation proceeds. The allyl alcohol in turn is oxypropylated, and thus the final product contains not only the desired trifunctional, oxypropylated glycerin product, but also contains monofunctional oxypropylated allyl alcohol-initiated species having degrees of oxypropylation from zero (i.e, allyl alcohol itself) to about the same degree of oxypropylation as the oxypropylated glycerin product.

The mechanism of this reaction has been discussed for example in Ceresa, Ed., "BLOCK AND GRAFT POLYMERIZATION", v.2 pp. 17–21, John Wiley & Sons, New York. By whatever mechanism the rearrangement is operating, the net result is that the functionality of polyols are significantly lowered, and the product contains large amounts of monofunctional species. For example, in the preparation of a 6000 Da (Dalton) molecular weight (2000 Da equivalent weight) oxypropylated glycerin, the actual functionality is closer to 2, and the product mixture may contain as much as 30 to 40 mol percent of monofunctional species. Due to the high polyol viscosity and to the relatively high vapor pressure of the various polyoxypropylene monol oligomers, it is virtually impossible to separate the desired polymeric, trifunctional species from the monofunctional, unsaturated impurities. The unsaturation of polyols produced by base catalysis generally runs from about 0.060 meq of unsaturation per gram polyol to about 0.12 meq/g.

Double metal cyanide complex catalysts were found to prepare polyoxyalkylene polyols having low levels of unsaturation, on the order of 0.018–0.020 meq/g. These levels of unsaturation are about one third to about one sixth the unsaturation of otherwise "similar" polyols produced by base catalysis, and even lower than the level of unsaturation produced through catalysis by other relatively "low" unsaturation-producing catalysts such as rubidium or cesium hydroxide (U.S. Pat. No. 3,393,243); barium or strontium hydroxide (U.S. Pat. Nos. 5,010,187 and 5,114,619) or metal naphthenates (U.S. Pat. No. 4,282,387).

However, the reaction rates provided by these early double metal cyanide complexes were relatively low, and the catalysts were found to be somewhat heat sensitive. The temperature sensitivity, prevented increasing the reaction rate by raising the temperature. Moreover, the double metal cyanide complex (DMC) catalysts were relatively expensive to manufacture. In addition to these drawbacks, the DMC catalysts and their residues proved to be difficult to remove from the product. This difficulty led to an intensive amount of research which culminated in a variety of improved methods of catalyst removal such as those described in U.S. Pat. Nos. 4,355,188; 4,877,906; and 5,248,833. Improved double metal cyanide catalysts such as those disclosed in U.S. Pat. No. 5,158,922 exhibited increases in catalytic activity to the extent that several DMC catalyzed polyols were offered commercially by one manufacturer for a brief time. These polyols offered low unsaturation in the range of 0.014 meq/g.

Recently, researchers at the ARCO Chemical Company have developed double metal cyanide catalysts which are far more active than any described previously. The catalytic activity is so high in some cases, that total process time is limited by the ability to remove heat from the reactor rather than by the rate of polymerization. These catalysts have also been found to offer other unique characteristics. For example, in some cases such small amounts of catalysts may be used that removal of catalyst residues may not be necessary. Moreover, even with larger amounts of catalyst, it has been found that the majority of catalyst residue can be removed by simple filtration rather than requiring use of any of the variety of treatments as described in the aforementioned patents. The preparation of these highly active DMC catalysts is described in U.S. Pat. Nos. 5,470,813; 5,482,908; and 5,545,601, all of which are incorporated herein by reference.

The general method of producing double metal cyanide complex catalysts may be described as set forth in U.S. Pat. No. 5,482,908. Aqueous solutions of a metal salt and a metal cyanide salt are reacted together in aqueous solution, preferably in the presence of a low molecular weight organic complexing agent using intensive mixing to produce a catalyst slurry. To the catalyst slurry may optionally be added a polyether complexing agent as well. The solid catalyst is isolated from the slurry as a wet cake, washed with aqueous solution containing additional organic complexing agent with or without additional polyether, isolated and dried.

It has been found, as reported in the '908, '813, and '601 patents, that a variety of process conditions can remarkably affect the nature and activity of the recovered catalyst. For example, it has been found that highly active catalysts may be prepared by reacting the metal salt and metal cyanide salt either under extremely high shear conditions, or in the presence of an organic complexing agent, or both. It has also been observed that due to the intensive mixing required to produce catalysts of high activity, considerable foaming occurs in the reactor, with a considerable amount of lower activity solids contained in the foam, decreasing catalyst yield and activity.

It has been further discovered that the number and nature of washing steps can affect the catalytic activity. However, the finely divided nature of the catalyst coupled with the viscosity of the complexing agent/polyol solution renders steps such as centrifugation, filtration, and washing very time consuming. These steps may easily comprise 80% of the total processing time. While lengthy processing may be tolerable in laboratory catalyst preparation, extended processing time during commercial manufacture leads to a much more expensive product. In many cases, the production cost of the catalyst as reflected by labor costs and capital equipment usage easily outstrips the cost of the raw materials used to prepare the catalyst. As a result, the cost/benefit ratio of the catalyst as compared to conventional catalyst decreases.

It would be desirable to provide a method for decreasing the total processing time of double metal cyanide catalysts. It would be further desirable to provide double metal cyanide catalysts of increased activity without increasing the processing time. It would be further desirable to prepare double metal cyanide catalysts in higher yield.

SUMMARY OF THE INVENTION

It has now been unexpectedly discovered that the use of a circulation loop which decouples the high intensity mixing requirement from that of the reactor per se, significantly reduces catalyst particle size and increases both catalyst activity and performance as measured by product physical properties. The circulation loop material can be sprayed into the top of the reactor, significantly improving catalyst yield. It has been further discovered that concentrating the wet cake to a higher solids content by pressing can decrease wash requirements without affecting catalyst performance. The use of these process improvements may be practiced individually, in combination, and/or in conjunction with other methods of process and/or catalyst improvement.

DESCRIPTION OF THE PREFERRED EMBODIMENTS

In order to fully understand the preferred embodiments and the improvements they produce, it is first necessary to understand the general manufacturing procedure for preparation of double metal cyanide complex catalysts. In the commercial manufacture of DMC catalysts, a large reaction vessel, generally glass lined, is charged with a solution of the required metal cyanide salt. The reactor size may be for example from 1000 to 3000 gallons or more in size (c.a. 3800–11,000 liter capacity). This tank may contain the metal cyanide salt dissolved in water at a fairly high level of dilution, this high level of dilution necessary in order to produce fine particle size catalysts. The contents of this tank are then pumped into an even larger tank along with the metal salt, the complexing agent, and when utilized, the additional complexing polyol.

As has been indicated in the previous discussion, in order to provide the most active catalysts, it has been found that very intensive mixing is required, preferably in conjunction with the presence of the complexing agent and optionally the polyol at this stage of double metal cyanide salt formation. However, the energy requirements for the high shear, energy intensive agitation of a 3000 gallon reactor are extreme. Many reactors are not designed for the high energy input required for this degree of mixing. Moreover, under highly intense mixing in the presence of aqueous complexing agent, severe foaming in the reactor may occur. This foam has been found to contain approximately 33% of the total double metal cyanide salt. Filtration of the reactor contents during a later stage of the process would, of course, recover the salt, although the foam may additionally impede the progress of the filtration. However, due to the fact that the double metal cyanide particles are entrained in the foam and not present in the continuous phase where the complexing reagents are present, the catalyst which is contained in the foam does not have the same catalytic activity as that present in the continuous phase.

It has now been found that if the continuous phase is circulated and sprayed into the reactor head space, foaming is reduced, and contact of catalyst particles with the continuous phase facilitated. It is believed that the spray causes a constant interchange of the particles contained in the foam with the liquid phase containing reactant salt and complexing agent. As a result, both high yield and high efficiency can be obtained by the use of this process.

It has further been surprisingly found that an in-line high shear mixer, for example of the power driven type, may be included in the circulation loop, and as a result of this, a yet further improved catalyst may be obtained. Particularly surprising is the fact this improvement occurs even with reactors having the capability for very intense mixing. The particles produced through decoupling of the mixing requirement are of smaller particle size and considerably higher activity than even those produced with a conventional agitator of much greater energy requirement.

During separation and washing of the DMC complex catalyst, the catalyst is collected as a wet cake containing approximately 15 to 25 weight percent catalyst which is then reslurried in pure complexing agent. Higher and lower solids contents may be used in particular processes, for example 10 weight percent to 30 weight percent. This slurry is then centrifuged and/or filtered to recover the final wet cake which is then dried. The purpose of this and other washing steps are to remove undesirable salts and other impurities. The washing and solid/liquid separation accounts for over 80% of production cycle time. Furthermore, the handling of wet cake containing but 15 weight percent to 25 weight percent solids is cumbersome due to the large wet cake, and creates a potential for personnel exposure. Both a first and second wash are generally required, as the relatively small solids content in the wet filter cake allows retention of some 75 to 85% of impurity-containing mother liquor.

It has now been discovered that by subjecting the wet cake to modest cake-compressing pressure in a suitable filtration device, a pressed wet cake containing in excess of 50% solids may be obtained without any appreciable energy or cycle time penalty. Diaphragm squeezing at moderate pressure has been found satisfactory. The type of "pressure filtering" is that which physically compresses the cake, as opposed to simple filtration under higher pressure in a filter press. The improvement in washing efficiency due to the higher levels of solids in the wet cake is such that a comparable catalyst can be produced with only one wash rather than two. The use of only one wash reduces cycle time, raw material usage, and reduces the potential operational difficulties and personnel exposures previously alluded to. Moreover, if a more highly purified catalyst is desired, a second wash may be utilized in which the product will have far fewer impurities than with the traditional two washes.

Double metal cyanide compounds useful in the invention are the reaction products of a water-soluble metal salt and a water-soluble metal cyanide salt. The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 6 and satisfies the valency state of M. Examples of suitable metal salts include, but are not limited to, zinc chloride, zinc bromide, zinc acetate, zinc acetonylacetate, zinc benzoate, zinc nitrate, iron(II) sulfate, iron(II) bromide, cobalt(II) chloride, cobalt(II) thiocyanate, nickel(II) formate, nickel (II) nitrate, and the like, and mixtures thereof. The salts listed above are exemplary only, and non-limiting.

The water-soluble metal cyanide salts used to make the double metal cyanide compounds useful in the invention preferably have the general formula $(Y)_a M^1(CN)_b(A)_c$ in which $M^1$ is selected from the group consisting of Fe(II), Fe(III), Co, Co(III), Cr(II), Os(III), Mn(II), Mn(III), Ir(III), Ir(II), Rh(III), Ru(II), V(IV), and V(V). More preferably, $M^1$ is selected from the group consisting of Co(II), Co(III), Fe(II), Fe(III), Cr(III), Ir(III), and Ni(II). The water-soluble metal cyanide salt can contain one or more of these metals. In the formula, Y may be an alkali metal ion or alkaline earth metal ion. A is an anion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of $M^1$. Suitable water-soluble metal cyanide salts include, but are not limited to, potassium hexacyanocobaltate(III), potassium hexacyanoferrate(II), potassium hexacyano-ferrate (III), calcium hexacyanocobaltate(III), lithium hexacyanoiridate(III), and the like.

Examples of double metal cyanide compounds that can be used in the invention include, for example, zinc hexacyanocobaltate(III), zinc hexacyano-ferrate(III), zinc hexacyanoferrate(II), nickel(II) hexacyanoferrate(II), colalt (II) hexacyano-cobaltate(III), and the like. Further examples of suitable double metal cyanide compounds are listed in U.S. Pat. No. 5,158,922, the teachings of which are incorporated herein by reference.

The catalyst compositions of the invention are prepared in the presence of a complexing agent. Generally, the complexing agent must be relatively soluble in water. Suitable complexing agents are those commonly known in the art, as taught, for example, in U.S. Pat. No. 5,158,922. The complexing agent is added either during preparation or immediately following precipitation of the double metal cyanide salt. Usually, an excess amount of the complexing agent is used. Preferred complexing agents are water-soluble heteroatom-containing organic compounds that can complex with the double metal cyanide compound, Suitable complexing agents include, but are not limited to, alcohols, aldehydes, ketones, ethers, esters, amides, ureas, nitrites, sulfides, and mixtures thereof. Preferred complexing agents are water-soluble aliphatic alcohols selected from the group consisting of glyme, ethanol, isopropyl alcohol, n-butyl alcohol, isobutyl alcohol, sec-butyl alcohol, and tert-butyl alcohol.

Preferably, the solid DMC catalysts of the invention include from about 5 to about 80 weight percent, based on the weight of catalyst product, of a polyether, preferably a polyether having a number average molecular weight greater than about 500 Da (Daltons). Preferred catalysts include from about 10 to about 70 weight percent of such polyethers; most preferred catalysts include from about 15 to about 60 weight percent of these polyethers. At least about 5 weight percent of the polyether is needed to significantly improve the catalytic activity compared with a catalyst made in the absence of the polyether. Catalysts that contain more than about 80 weight percent of the polyether generally are no more active, and they are impractical to isolate and use because they are typically sticky pastes rather than powdery solids.

Suitable polyethers include those produced by ring-opening polymerization of cyclic ethers, and include polyoxyalkylene polymers prepared by the polymerization of alkylene oxides, oxetane, and/or tetrahydrofuran. Any method of catalysis can be used to make the polyethers. The polyethers can have any desired end groups, including, for example, hydroxyl, amine, ester, ether, or the like. Preferred polyethers are polyether polyols having average hydroxyl functionalities from about 2 to about 8 and number average molecular weights within the range of about 1000 to about 10,000, more preferably from about 1000 to about 5000. These are usually made by polymerizing epoxides in the presence of active hydrogen-containing initiators and basic, acidic, or organometallic catalysts (including DMC catalysts). Useful polyether polyols include polyoxypropylene polyols, ethylene oxide-capped polyoxypropylene polyols, mixed polyox-ethylene/poly-oxypropylene copolymer polyols, polyoxybutylene polyols, polyoxybutylene copolymers containing ethylene oxide and/or propylene oxide-derived moieties, polytetramethylene ether glycols (PTMEG), and the like. Polyoxyethylene homopolymer glycols are generally not useful in the invention. More preferred are polyoxypropylene polyols, particularly diols and triols having number average molecular weights within the range of about 2000 to about 4000.

Another preferable group of solid DMC catalysts useful in the practice of the subject invention include from about 5 to about 80 weight percent of a polyether polyol in which some or all of the terminal hydroxyl groups are tertiary hydroxyl groups. Preferred catalysts include from about 10 to about 70 weight percent, more preferably 15 to about 60 weight percent of the tertiary hydroxyl group-containing polyether polyol. Polyether polyols preferred for use in making the tertiary-hydroxyl group-containing catalysts have at least some tertiary hydroxyl groups, preferably at least about 5% tertiary hydroxyl groups. More preferred are polyols that have at least about 20% tertiary hydroxyl groups.

Tertiary hydroxyl groups are conveniently introduced by including a cyclic monomer that is fully substituted at the a-carbon atom of the cyclic ether. Cyclic ethers useful for introducing tertiary hydroxyl groups include, for example, isobutylene oxide, 1,1,2-trimethylethylene oxide, 1,1,2,2,-tetramethylethylene oxide, 2,2-dimethyloxetane, diisobutylene oxide, α-methylstyrene oxide, and the like. For example, one polyether polyol suitable for use in making the catalysts of the invention is prepared by making a polyoxypropylene polyol using double metal cyanide catalysis, and then adding isobutylene oxide to cap the polyol and convert some or most of the hydroxyl groups from primary or secondary hydroxyl groups to tertiary hydroxyl groups. Suitable polyether polyols also include those in which tertiary hydroxyl group content is introduced by including a lactone monomer in which the carbon α- to the lactone oxygen is fully substituted. Thus, for example, a suitable polyol for use in the invention is made by reacting a polyoxypropylene polyol with ε,ε-dimethyl-ε-caprolactone to cap the polyol and give a product in which at least some of the hydroxyl groups are tertiary hydroxyl groups.

Detailed procedures for the making double metal cyanide catalysts are disclosed in U.S. Pat. Nos. 5,158,922; 5,470,813; 5,545,601; and 5,482,908, which are incorporated herein by reference. However, other procedures may be used as well. In the procedures utilized in the aforementioned patents the metal salt is generally used in excess. The admixture of metal salt and metal cyanide salt solutions preferably takes place in the presence of at least the organic complexing agent, and generally under high shear mixing conditions. Thus, thorough agitation at high speed is necessary for this phase of the reaction. Following addition of all the reagents, agitation is continued until the reaction is complete. This time may vary between approximately 10 minutes and several hours depending upon the size of the reactor, the rate of addition of the components initially, and various other factors. Proper reaction time can easily be obtained by measuring the activity of a sample aliquot of the reactor contents. However, it is more preferable to base the total reaction time on past batch histories.

Following the reaction, the reactor contents are centrifuged and/or filtered to remove at least a portion of the continuous liquid medium and isolate the solids. In this manner, a wet cake containing an appreciable amount of mother liquor is obtained. This cake is then reslurried in aqueous complexing agent, for example 66 weight percent t-butanol, and again isolated by centrifugation or filtration as a second wet cake. This wet cake is then reslurried in pure t-butanol. Finally, another filtration/centrifugation followed by drying results in the isolation of the finished catalyst. Depending upon the nature of the drying step, the catalyst particle size may be required to be reduced by traditional methods such as ball milling and the like. Particle sizes discussed herein are average particle sizes as determined by a Microtrac particle size analyzer.

In the present invention, an improved catalyst of higher yield can be obtained through the use of a circulation loop and the spraying of the cycled liquid phase into the head space of the reactor; by incorporating a high shear mixer in this recirculation loop or in a further recirculation loop; and by concentrating the wet cake obtained in the initial and/or second or subsequent centrifugation/filtration steps so as to concentrate the percentage of solids to a higher level, preferably greater than about 40 weight percent, and preferably to beyond approximately 50 weight percent. Preferably, all three of these catalyst improving features are used in the same process. Yet further improvements are made possible by employing a non-agglomerative drying step.

Having generally described this invention, a further understanding can be obtained by reference to certain specific examples which are provided herein for purposes of illustration only and are not intended to be limiting unless otherwise specified.

EXAMPLES 1 AND 2 AND COMPARATIVE EXAMPLES C1, C2, C3

Experiments were conducted in a 5 gallon reactor to study the effect of mixing on catalyst quality. An in-line high shear mixer (LB308 mixer, available from Kady, Intl.) was installed in a circulation line and supplied with liquid phase from the bottom of the reactor through a pump having a capacity of 1 gallon per minute. The catalyst utilized for the study is a t-butanol complex of zinc hexacyanocobaltate modified by additional complexing with polyether as taught by U.S. Pat. No. 5,482,908. The reagent charges were the same in all Examples and Comparative Examples, and thus the only variable was the degree of mixing and the presence or absence of in-line high shear mixing. The activities of the catalysts are measured by the procedure employed in U.S. Pat. No. 5,545,601. The "6K-Triol Rate" is the maximum rate of oxypropylation of a glycerine-based triol in grams of propylene oxide per minute. The results of these studies are presented in Table 1 below.

TABLE 1

| Example | Agitation (rpm) | In-Line Mixer Used | Agitation During First Polyol Addition (rpm) | 50% Particle Below ($\mu$m) | 6K-Triol Rate (g/min) |
|---|---|---|---|---|---|
| C1 | 1225 | No | 150 | NA | 26.6 |
| C2 | 300 | No | 150 | 6.26 | 20.4 |
| 1 | 300 | Yes | 150 | 2.30 | 25.0 |
| C3 | 100 | No | 100 | 6.28 | 19.2 |
| 2 | 100 | Yes | 100 | 2.25 | 31.0 |

The above data indicates that use of a high shear in-line mixer surprisingly increases catalytic activity by large amounts. Furthermore, the use of the in-line high shear mixer reduces particle size to approximately ⅓ of that available in the absence of this type of mixing. The reduced particle size may be one of the factors responsible for the much higher catalytic activity of the catalyst produced by the use of the subject process.

It was further found that in decreasing the agitational speed of the main reactor during double metal cyanide salt preparation, the polymerization rate achieved by the catalysts in polyoxypropylation decreased accordingly. Thus, at 1225 rpm, a very high rate of agitation, a polymerization rate of 26.6 grams propylene oxide per minute (based on 25 ppm catalyst relative to finished polyol) was obtained, whereas at 300 rpm a slower rate of polymerization of 20.4 grams propylene oxide per minute was obtained. At 100 rpm, a slight further decrease to 19.2 g/min was obtained. Noteworthy however, was the fact that at 300 rpm, an agitation speed easily accomplished by commercial reactors, but with agitation requirements decoupled from the reactor through use of an in-line high shear mixer, the polymerization rate of the catalyst thus produced is very close to that obtained at the much higher and more energy intensive speed of 1225 rpm.

Even more surprising is that the polymerization rate of catalysts obtained using an agitator speed of only 100 and use of an in-line high shear mixer, the polymerization rate is the highest of all at 31.0 grams propylene oxide per minute. This highly active catalyst was also produced at a low polyol addition agitation speed. The improvement in catalyst quality as a result of lower speed agitation of the main reactor during polyol addition may be illustrated by comparing Example 2 (100 rpm) and Example 1 (150 rpm). The total energy input/unit volume of fluid utilizing an in-line high shear mixer in conjunction with the energy used to agitate the vessel per se, is far lower than the energy required to agitate a vessel at higher speed, e.g. 1225 rpm. It is very surprising that catalysts of smaller particle size and higher activity may be obtained when the total energy input is thus lowered. Moreover, the overall reduced energy usage reduces both capital investment expense and operating cost.

EXAMPLES 3 AND 4 AND COMPARATIVE EXAMPLES C4 and C5

In these Examples and Comparative Examples, a commercial vessel having excellent agitation capacity was utilized to prepare two DMC complex catalysts employing the same reagents and reaction conditions, with the exception that in Examples 3 and 4, an in-line high shear mixer was utilized in a circulation loop, whereas in Comparative Examples C4 and C5, no circulation loop or in-line mixer was used. The results are presented in Table 2 below. The column headed "Viscosity" is the measured polyol viscosity produced by the catalyst employing the same polyoxyalkylation procedure as in the preceding examples, while the heading HMW Tail is the amount of very high molecular weight (>100,000 Da) polyether contained in the polyols produced. Smaller amounts of high molecular weight tail are desirable.

TABLE 2

| Example: | 3 | C4 | 4 | C5 |
|---|---|---|---|---|
| Preparation Conditions: | | | | |
| Main Reactor Agitation (rpm) | 300 | 300 | 1225 | 1225 |
| In-line Mixer | Yes | No | Yes | No |
| 100% particles <d ($\mu$m) | — | — | 6.54 | 11.0 |
| 8K Da Diol Properties HMW Tail (ppm) | 3344 | 5039 | 2832 | 3218 |
| Viscosity (cps @ 25° C.) | 4205 | 5807 | 4215 | 4720 |

The results presented in the Table indicate that even in reactors where agitation capacity is more than adequate, addition of a high shear in-line mixer causes an appreciable increase in the performance of the catalyst. In particular, the particle size is lower, and the viscosity of an 8K-diol prepared from the catalyst at the same concentration is lower. Polyols prepared from catalysts manufactured in accordance with the subject invention have also been observed to have significantly lower polydispersities as well.

COMPARATIVE EXAMPLE C6

A zinc hexacyanocobaltate catalyst is manufactured by the addition of an aqueous solution of potassium hexacyanocobaltate to an aqueous solution of zinc chloride with t-butanol added as the organic complexing agent. A small quantity of a polyether polyol is then added to further enhance the activity of the catalyst. The procedure is essentially that described in U.S. Pat. Nos. 5,482,908 and 5,545,601. During the vigorous agitation involved in the preparation of the catalyst a considerable quantity of foam accumulates at the top of the reactor. This amount of foam is shown to contain approximately 30–35% of the total zinc hexacyanocobaltate and its partial or complete reaction products with t-butanol and polyoxyalkylene polyol. Collection of catalyst samples from the foam and from the liquid phase indicates that the catalyst contained in the foam is of considerably lesser activity than that contained in the liquid phase. The filtered and dried catalyst will thus be non-uniform in the sense that some catalyst particles will be of lesser activity than others, and thus the total activity will be lessened accordingly.

EXAMPLE 5

A second catalyst preparation is performed exactly like that of Comparative Example C6 except that a portion of the liquid phase is recirculated through a circulation loop back to the head space of the reactor, and sprayed through spray nozzles onto the surface of the foam which has accumulated. The quantity of foam appears to be diminished as compared with that obtained without the circulation loop. Moreover, a sample of catalyst obtained from the foam is compared with the catalyst contained in the liquid phase, and found to be far closer in catalytic performance than the respective samples from Comparative Example C6.

EXAMPLE 6 AND COMPARATIVE EXAMPLE C7

A zinc hexacyanocobaltate.t-butanol complex double metal cyanide catalyst is prepared in accordance with the procedure disclosed in U.S. Pat. No. 5,470,813, in a 200 gallon reactor. Following the reaction of the zinc chloride, potassium hexacyanocobaltate and t-butanol to produce the DMC complex catalyst, the reactor contents are centrifuged and filtered, and the solids isolated as a wet filter cake containing from about 15 weight percent to 25 weight percent solids. These solids are reslurried in a 66 weight percent t-butanol solution, stirred for 30–120 minutes, and recentrifuged and refiltered. The wet centrifuge cake, again containing approximately 15–25 weight percent solids, is reslurried in pure t-butanol. The slurry is centrifuged to recover a final wet cake which is then dried. This catalyst is Comparative Example catalyst C7.

A procedure similar to that immediately above was followed with the exception that the wet centrifuge cake containing from about 15 weight percent to 25 weight percent catalyst was squeezed under pressure to eliminate liquid to the point where the solids content was greater than 50 weight percent. This higher solids wet cake was then slurried immediately in t-butanol rather than being first washed in aqueous t-butanol. The catalyst is then filtered to 50% solids and dried. As a result of the elimination of the first wash and of the second centrifugation step, a savings of about 25% of total process time is achieved. This catalyst is catalyst Example 6. A comparison of the activities of the catalyst of Example 6 and the catalyst of Comparative Example C7 is presented in Table 3 below. The headings "viscosity", "unsaturation", and "HMW Tail" (high molecular weight tail) are properties of 8000 Da polyoxypropylene diols prepared from the respective catalysts. Viscosity is expressed in cps, unsaturation in meq/g, and HMW tail in ppm relative to polyol weight.

TABLE 3

| Example | Wash Procedure | Viscosity | Unsaturation | HMW Tail |
|---|---|---|---|---|
| C7 | Standard washes | 3276 | 0.0049 | 1640 |
| 6 | Eliminated 1st wash | 3215 | 0.0051 | 1555 |

From Table 3, it is evident that in the preparation of an 8000 Da diol, that the catalyst prepared according to the subject invention with only one wash is virtually identical, and possibly even slightly superior to the catalyst prepared in the conventional manner employing two washes. The viscosity of the polyol prepared with the Example 6 catalyst was slightly lower at 3215 cps as compared with the 3276 cps viscosity of the polyols prepared with the C7 comparative catalyst; the unsaturations of both polyols are approximately the same, in both cases being in the ultra-low unsaturation range; and the proportion of high molecular weight tail in the subject catalyst prepared polyol example is less than that of the Comparative Example. It should be noted that the high molecular weight tail is an exceptionally high molecular weight species believed to have molecular weight in excess of 100,000 Da which has been found to be present in ultra-low unsaturation polyols prepared through double metal cyanide complex catalysis. While the amount of this high molecular weight tail is exceptionally small, being difficult to detect chromatographically, its effect is shown in some formulations by anomalous behavior of polyurethane formulations employing these polyols. For example, some polyurethane foam formulations employing polyols with appreciable high molecular weight tail content exhibit foam collapse. Thus, the amount of high molecular weight tail should be minimized. It is believed that the high molecular weight tail acts as surfactant in polymer systems, altering the hard segment/soft segment phase out and other morphological characteristics during cure.

While the improvements described herein are of considerable utility in manufacturing highly active DMC catalysts with minimal process time, further improvements may be made by combining these process improvements with others, particularly non-agglomerative drying methods. In traditional processing, the wet cake is dried conventionally on trays. During the drying operation, considerable agglomeration of catalyst particles takes place. To regain the original particle size, intensive and time-consuming grinding must be used. The grinding operation can consume a large fraction of total processing time. By employing non-agglomerative drying methods, total process time can be decreased as grinding is either no longer necessary, or may be of sharply reduced duration. Examples of suitable non-agglomerative drying methods are spray drying, freeze drying, rotary drying, and like processes where particle-to-particle contact during drying is either eliminated, considerably reduced, or the duration of individual contacts is minimized. The improvements can be documented by the following examples.

EXAMPLE 7 AND COMPARATIVE EXAMPLE C8

Two otherwise similar batches of catalyst were prepared in the form of a wet cake. The first batch (Comparative Example C8) was tray-dried conventionally. The second batch was dried in a commercial rotary dryer to minimize particle agglomeration. Two 8000 Da polyoxypropylene diols were prepared employing the Example 7 and Comparative Example C8 catalysts. The results are presented in Table 4 below.

TABLE 4

| Catalyst | Drying | Grinding | Polyol Viscosity | Polyol Unsaturation |
|---|---|---|---|---|
| Example 7 | Rotary | None | 4075 | 0.0040 |
| Comparative Example C8 | Tray | Ball Milled | 4139 | 0.0047 |

Having now fully described the invention, it will be apparent to one of ordinary skill in the art that many changes and modifications can be made thereto without departing from the spirit or scope of the invention as set forth herein.

What is claimed is:

1. A method for producing a double metal cyanide catalyst in increased yield and/or a double metal cyanide catalyst having increased catalytic activity, comprising:
   preparing a double metal cyanide complex in an agitated reactor to form a dispersion of solid catalyst in a liquid phase;
   separating said solid catalyst from said liquid phase to form a wet cake;
   washing said solid catalyst by slurrying said wet cake in a wash liquid; and
   isolating said solid catalyst from said wash liquid,
   wherein a catalyst yield and/or performance improvement step is practiced, said catalyst yield and/or performance improvement step selected from one or more of the group consisting of
      a) during said stage of preparing, withdrawing a portion of said dispersion of solid catalyst in said liquid phase to form a recycle stream; recycling said recycle stream to a headspace of said reactor; and spraying said recycle stream into said headspace, contacting at least a portion of said recycle stream with a foam phase which is present above said dispersion of solid catalyst in said liquid;
      b) during said stage of preparing, withdrawing a portion of said solid catalyst dispersion in said liquid phase to form a circulation stream; directing said circulation stream through a high shear in-line mixer; and reintroducing said circulation stream into said reactor; and
      c) during said step of separating, concentrating said solid catalyst in said wet cake such that a wet cake containing about 40 weight percent or more solids is obtained.

2. The process of claim 1 wherein said double metal cyanide is zinc hexacyanocobaltate.

3. The process of claim 1 wherein step (a) and step (b) are performed by a single stream which is a recycle/circulation stream by first directing said single stream through a high shear in-line mixer and then directing said single stream from said higher shear in-line mixer to one or more spray nozzles spraying into said reactor head space.

4. The process of claim 1 wherein step (a) and step (b) are performed concurrently, each step performed by respective separate recycle and circulation streams.

5. The process of claim 1 wherein step (b) is practiced, and wherein the average particle size of said solid catalyst is less than about 50% of the average particle size obtained without step (b).

6. The process of claim 1 wherein said wet cake is prepared by isolating a wet cake containing from about 10 weight percent to about 30 weight percent solids, and exerting pressure on said wet cake to increase the solids content of said wet cake to about 50 weight percent or more.

7. The process of claim 6 wherein the solids contents of said wet cake is increased to about 60 weight percent or more.

8. The process of claim 6 wherein said pressure is exerted by diaphragm squeezing.

9. A process for increasing the overall yield of a double metal cyanide complex catalyst prepared in an agitated reactor, comprising practicing step (a) of claim 1 during catalyst manufacture.

10. A process for the preparation of an improved double metal cyanide complex catalyst, comprising practicing step (b) of claim 1 during catalyst manufacture.

11. A process for the preparation of an improved double metal cyanide catalyst, comprising practicing step (c) of claim 1 during catalyst manufacture, followed by reslurrying said higher solids wet cake in further wash liquid and separating double metal cyanide complex catalyst solids from said further wash liquid.

12. A process for the preparation of an improved double metal cyanide complex catalyst, comprising practicing the process of claim 1 followed by a non-agglomerative drying step.

13. The process of claim 12 wherein said non-agglomerative drying step comprises rotary drying.

14. In a method for producing a double metal cyanide catalyst by:

preparing a double metal cyanide complex in an agitated reactor to form a dispersion of solid catalyst in a liquid phase, the improvement comprising selecting a catalyst yield and/or performance improvement step selected from one or more of the group consisting of a) during said step of preparing, withdrawing a portion of said dispersion of solid catalyst in said liquid phase to form a recycle stream; recycling said recycle stream to a headspace of said reactor; and spraying said recycle stream into said headspace, contacting at least a portion of said recycle stream with a foam phase which is present above said dispersion of solid catalyst in said liquid; and b) during said step of preparing, withdrawing a portion of said solid catalyst dispersion in said liquid phase to form a circulation stream; directing said circulation stream through a high shear in-line mixer; and reintroducing said circulation stream into said reactor.

* * * * *